(12) United States Patent
Meng et al.

(10) Patent No.: US 10,540,563 B2
(45) Date of Patent: Jan. 21, 2020

(54) METHOD FOR RECOGNIZING PICTURE, METHOD AND APPARATUS FOR LABELLING PICTURE, AND STORAGE MEDIUM

(71) Applicant: Baidu Online Network Technology (Beijing) Co., Ltd., Beijing (CN)

(72) Inventors: Xianglong Meng, Beijing (CN); Guoyi Liu, Beijing (CN); Shumin Han, Beijing (CN); Canxiang Yan, Beijing (CN); Yuning Du, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/529,425

(22) PCT Filed: Dec. 10, 2015

(86) PCT No.: PCT/CN2015/096981
§ 371 (c)(1),
(2) Date: May 24, 2017

(87) PCT Pub. No.: WO2017/008435
PCT Pub. Date: Jan. 19, 2017

(65) Prior Publication Data
US 2018/0114084 A1    Apr. 26, 2018

(30) Foreign Application Priority Data
Jul. 13, 2015  (CN) .......................... 2015 1 0408391

(51) Int. Cl.
*G06K 9/32*  (2006.01)
*G06T 7/10*  (2017.01)
*G06T 7/70*  (2017.01)

(52) U.S. Cl.
CPC ......... *G06K 9/3241* (2013.01); *G06K 9/3208* (2013.01); *G06T 7/10* (2017.01); *G06T 7/70* (2017.01)

(58) Field of Classification Search
CPC ........... G06K 9/3241; G06T 7/10; G06T 7/73; G06T 7/70
See application file for complete search history.

(56) References Cited

U.S. PATENT DOCUMENTS 7,660,468 B2 * 2/2010 Gokturk .................... G06K 9/46
                                                             382/224
8,798,362 B2 * 8/2014 Wang .................. G06K 9/00369
                                                             382/165
(Continued)

FOREIGN PATENT DOCUMENTS

CN        1748601 A       3/2006
CN        1831846 A       9/2006
(Continued)

OTHER PUBLICATIONS

English Translation of the Written Opinion of the International Search Authority for PCT/CN2015/09681 (Year: 2016).*
(Continued)

*Primary Examiner* — Kim Y Vu
*Assistant Examiner* — Molly Delaney
(74) *Attorney, Agent, or Firm* — Nixon Peabody LLP (57) ABSTRACT

A method for recognizing a picture, a method and an apparatus for labelling a picture, and a storage medium. The method for recognizing a picture comprises: acquiring a clothes picture labelled with a positioning key point and a clothes wearing region (S310); extracting, based on the locations of the clothes wearing region and the positioning key point, at least one picture region representing a feature region from the clothes picture (S320); and respectively acquiring feature information representing the feature region
(Continued)

based on a region feature recognition model corresponding to the feature region (S330). By labelling the positioning key point, a picture representing a clothes content in the clothes picture is positioned, so that the interference of a background content in the clothes picture is reduced. On this basis, a picture region representing a feature region is extracted from a clothes picture based on a clothes wearing region and a labelled positioning key point, and then feature information on the feature region is acquired based on a corresponding region feature recognition model, thereby enhancing the accuracy and precision of recognizing the feature information on clothes in the clothes picture.

28 Claims, 6 Drawing Sheets

(56) References Cited

U.S. PATENT DOCUMENTS

| | | | |
|---|---|---|---|
| 9,691,161 B1* | 6/2017 | Yalniz | G06K 9/6201 |
| 2008/0144943 A1 | 6/2008 | Gokturk et al. | |
| 2009/0116698 A1* | 5/2009 | Zhang | G06K 9/00362 |
| | | | 382/111 |
| 2011/0274314 A1* | 11/2011 | Yang | G06K 9/00369 |
| | | | 382/103 |
| 2013/0343615 A1* | 12/2013 | Zhang | G06K 9/00664 |
| | | | 382/111 |
| 2014/0314313 A1* | 10/2014 | Kennedy | G06K 9/00369 |
| | | | 382/165 |
| 2015/0127592 A1 | 5/2015 | Yan et al. | |
| 2015/0248583 A1* | 9/2015 | Sugita | G06K 9/00369 |
| | | | 348/77 |

FOREIGN PATENT DOCUMENTS

| | | |
|---|---|---|
| CN | 103955719 A | 7/2014 |
| CN | 104584033 A | 4/2015 |

OTHER PUBLICATIONS

International Search Report corresponding to International Patent Application No. PCT/CN2015/096981, State Intellectual Property Office of the P.R. China, dated Apr. 12, 2016; (2 pages).

* cited by examiner

Fig. 8

METHOD FOR RECOGNIZING PICTURE, METHOD AND APPARATUS FOR LABELLING PICTURE, AND STORAGE MEDIUM

CROSS-REFERENCE TO RELATED APPLICATION

This patent application is a U.S. National Stage of International Application No. PCT/CN2015/096981, filed Dec. 10, 2015, which claims the priority to and the benefit of the Chinese Patent Application No. 201510408391.5, filed on Jul. 13, 2015, entitled "Method For Recognizing Picture, Method and Apparatus for Labelling Picture," having Baidu Online Network Technology (Beijing) Co., Ltd as the applicant, the entire disclosures of which are hereby incorporated by reference in their entireties.

TECHNICAL FIELD

The present disclosure relates to the field of picture recognition technologies, and more particularly, to a method for recognizing a picture, a method and an apparatus for labelling a picture, and a storage medium.

BACKGROUND

The desire to look attractive is universal. Researches show that 55% of first impressions of others on every one of us depend on our dressing. Thus, dressing plays a very important role in our daily life. However, if feature information (such as clothes categories and clothes colors) of clothes can be learned in advance when the clothes are selected, it will be advantageous for us to select fitted and favorite clothes.

In the prior art, when feature information of clothes is recognized, feature information recognition is performed on the overall pictures containing clothes pictures. In most cases, the overall pictures contain background pictures, and the clothes pictures only account for a part of the overall pictures. Therefore, when feature information recognition is performed on the overall pictures containing the clothes pictures, the accuracy and precision of recognition may be reduced, and even a situation that a recognition result is completely wrong occurs.

SUMMARY

Embodiments of the present disclosure provide a method for recognizing a picture, a method and an apparatus for labelling a picture, and a storage medium to accurately recognize feature information of a feature region of a target object picture so that a satisfactory target object can be preferably selected from numerous target object pictures.

According to an aspect of the present disclosure, an embodiment of the present disclosure provides a method for recognizing a picture, which comprises:

acquiring a target object picture labelled with a positioning key point and a region of the target object;

extracting, based on locations of the positioning key point and the region of the target object comprised in the acquired target object picture, at least one picture region representing a feature region from the target object picture; and acquiring feature information representing the feature region based on a region feature recognition model corresponding to the feature region.

Optionally, the target object is clothes, and the region of the target object is a clothes wearing region.

According to an aspect of the present disclosure, the present disclosure provides a method for recognizing a clothes picture, which comprises: acquiring a clothes picture labelled with a positioning key point and a clothes wearing region; extracting, based on locations of the clothes wearing region and the positioning key point, at least one picture region representing a feature region from the clothes picture; and respectively acquiring feature information representing the feature region based on a region feature recognition model corresponding to the feature region.

Optionally, the feature information comprises information on a clothes type and/or an attribute of the feature region.

Optionally, the attribute of the feature region comprises at least one of: a clothes type, a skirt type, a pants type, a collar type, a sleeve type, a clothes length, a skirt length, a pants length and a sleeve length.

Optionally, the feature region comprises at least one of: an upper body region, a lower body region, a whole body region, a collar region, a chest region and a sleeve region.

According to another aspect of the present disclosure, an embodiment of the present disclosure further provides a method for labelling a picture, which comprises:

acquiring a target object picture;

acquiring information, in the target object picture, of a region of the target object based on a pre-established target object classification model; and labelling a positioning key point for the target object picture based on a pre-established target object key point positioning model.

Optionally, the target object is clothes, and the region of the target object is a clothes wearing region.

According to another aspect of the present disclosure, the present disclosure further provides a method for labelling a clothes picture, which comprises: acquiring a clothes picture; acquiring information of the clothes wearing region in the clothes picture based on a pre-established clothes classification model; and labelling a first positioning key point for the clothes picture based on a pre-established clothes key point positioning model.

Optionally, the method further comprises: acquiring rotation angle information of clothes in the clothes picture based on information of the labelled first positioning key point; rotating and correcting the clothes picture based on the rotation angle information; and labelling a second positioning key point for the rotated and corrected clothes picture based on the clothes key point positioning model.

Optionally, the clothes wearing region divided by the clothes classification model comprises tops, bottoms, split clothing and jumpsuits.

Optionally, the clothes classification model is a clothes classification model established based on a convolutional neural network.

According to another aspect of the present disclosure, an embodiment of the present disclosure further provides an apparatus for recognizing a picture, which comprises:

a target object picture acquiring module, configured to acquire a target object picture labelled with a positioning key point and a region of the target object;

a target object region picture extracting module, configured to extract, based on locations of the positioning key point and the region of the target object comprised in the acquired target object picture, at least one picture region representing a feature region from the target object picture; and a target object feature information acquiring module, configured to acquire feature information representing the feature region based on a region feature recognition model corresponding to the feature region.

Optionally, the target object is clothes, and the region of the target object is a clothes wearing region.

According to another aspect of the present disclosure, the present disclosure further provides an apparatus for recognizing a clothes picture, which comprises: a clothes picture acquiring unit, configured to acquire a clothes picture labelled with a positioning key point and a clothes wearing region; a region picture extracting unit, configured to extract, based on locations of the clothes wearing region and the positioning key point, at least one picture region representing a feature region from the clothes picture; and a feature information acquiring unit, configured to respectively acquire feature information representing the feature region based on a region feature recognition model corresponding to the feature region.

Optionally, the feature information comprises information on a clothes type and/or an attribute of the feature region.

Optionally, the attribute of the feature region comprises at least one of: a clothes type, a skirt type, a pants type, a collar type, a sleeve type, a clothes length, a skirt length, a pants length and a sleeve length.

Optionally, the feature region comprises at least one of: an upper body region, a lower body region, a whole body region, a collar region, a chest region and a sleeve region.

According to another aspect of the present disclosure, an embodiment of the present disclosure further provides an apparatus for labelling a picture, which comprises:

a target object picture acquiring module, configured to acquire a target object picture;

a region of the target object acquiring module, configured to acquire information, in the target object picture, of a region of the target object based on a pre-established target object classification model; and a target object key point labelling module, configured to label a positioning key point for the target object picture based on a pre-established target object key point positioning model.

Optionally, the target object is clothes, and the region of the target object is a clothes wearing region.

According to another aspect of the present disclosure, the present disclosure further provides an apparatus for labelling a clothes picture, which comprises: a clothes picture acquiring unit, configured to acquire a clothes picture; a wearing region acquiring unit, configured to acquire information of the clothes wearing region in the clothes picture based on a pre-established clothes classification model; and a first key point labelling unit, configured to label a first positioning key point for the clothes picture based on a pre-established clothes key point positioning model.

Optionally, the apparatus further comprises: a rotation angle feature information acquiring unit, configured to acquire rotation angle information of clothes in the clothes picture based on information of the labelled first positioning key point; a rotating and correcting unit, configured to rotate and correct the clothes picture based on the rotation angle information; and a second key point labelling unit, configured to label a second positioning key point for the rotated and corrected clothes picture based on the clothes key point positioning model.

Optionally, the clothes wearing region divided by the clothes classification model comprises tops, bottoms, split clothing and jumpsuits.

Optionally, the clothes classification model is a clothes classification model established based on a convolutional neural network.

According to another aspect of the present disclosure, an embodiment of the present disclosure further provides a non-volatile computer storage medium. The computer storage medium stores one or more modules. When the one or more modules are performed by a device for executing the method for recognizing a picture, the device is caused to:

acquire a target object picture labelled with a positioning key point and a region of the target object;

extract, based on locations of the positioning key point and the region of the target object comprised in the acquired target object picture, at least one picture region representing a feature region from the target object picture; and acquire feature information representing the feature region based on a region feature recognition model corresponding to the feature region.

According to another aspect of the present disclosure, an embodiment of the present disclosure further provides a non-volatile computer storage medium. The computer storage medium stores one or more modules. When the one or more modules are performed by a device for executing the method for labelling a picture, the device is caused to:

acquire a target object picture;

acquire information, in the target object picture, of a region of the target object based on a pre-established target object classification model; and label a positioning key point for the target object picture based on a pre-established target object key point positioning model. According to the method and apparatus for labelling a clothes picture and a storage medium provided by the embodiments of the present disclosure, information of the clothes wearing region in the clothes picture is acquired based on a pre-established clothes classification model, and a positioning key point is labelled for the clothes picture based on a pre-trained clothes key point positioning model. By labelling the positioning key point, a picture representing a clothes content in the clothes picture is positioned, so that the interference of a background content in the clothes picture is reduced.

On this basis, according to the method and apparatus for recognizing a clothes picture and a storage medium provided by the embodiments of the present disclosure, first a picture region representing a feature region is extracted from a clothes picture based on a clothes wearing region and a labelled positioning key point, and then feature information on the feature region is acquired based on a corresponding region feature recognition model. Therefore, compared with the prior art, the technical solutions of the present disclosure improve the accuracy and precision of recognizing the feature information on clothes in the clothes picture.

DETAILED DESCRIPTION OF EMBODIMENTS

In general, the present disclosure relates to two aspects. In one aspect, a region of the target object is recognized from a target object picture and a positioning key point is labelled for the target object. In the other aspect, a picture region embodying an attribute of the target object is extracted based on the region of the target object and the labelled positioning key point, and a feature of each feature region of the target object is recognized by means of a pre-trained region feature recognition model.

Embodiment I

An embodiment of the present disclosure provides a method for labelling a picture, comprising:

S001: acquiring a target object picture.

In this embodiment, a corresponding target object may be selected based on an attribute of object and demands of a user for a particular object, and then the corresponding target object picture may be acquired.

Typically, the target object may comprise: clothes, auto spare parts, animals and plants, household appliances and articles for daily use, etc.

S002: acquiring information, in the target object picture, of a region of the target object based on a pre-established target object classification model.

In this embodiment, based on different selected target objects, different target object classification models may be pre-established, and then the region of the target object in the target object picture may be determined based on the classification model.

In a specific example, when the selected target object is clothes, a corresponding clothes category classification model (such as T shirts, shirts or sun-tops) may be established, and the corresponding region of the target object is a clothes wearing region (such as tops, bottoms or jumpsuits).

When selected target objects are auto spare parts, corresponding auto spare part classification models (such as automotive lamps, automotive doors or tyres) may be established, and the corresponding regions of the target objects are configuration regions (such as automotive front parts, automotive side frames or automotive bottoms) of the auto spare parts in automobiles.

Preferably, a target object classification model configured to classify the region of the target object may be trained according to a first target object picture training sample set for which the region of the target object is labelled in advance.

S003: labelling a positioning key point for the target object picture based on a pre-established target object key point positioning model.

In this embodiment, target object positioning key points need to be predefined for each region of the target object corresponding to different target object pictures. For example, for an automotive lamp, eight positioning key points may be defined, including: each point at either side of an automotive head, each point respectively from the middle of the automotive head at setting position distance, each point at either side of an automotive tail, and each point respectively from the middle of the automotive tail at setting position distance.

Similarly, a target object key point positioning model configured to position/label a positioning key point for the target object picture may be trained based on a second target object picture training sample set for which the positioning key point and the region of the target object are labelled in advance.

Specifically, a sample picture for which the region of the target object has been labelled is acquired, the positioning key points are labelled for the sample picture based on the region of the target object of the sample picture, and the sample picture for which the positioning key points have been labelled is trained using a preset training algorithm. In this way, the target object key point positioning model corresponding to the sample picture is obtained.

The target object picture labelled by using the method according to Embodiment I of the present disclosure may be used for recognizing a target object picture based on locations of the positioning key points and the region of the target object included in the target object picture.

Using the method for labelling a picture provided by the embodiment of the present disclosure, information, in the target object picture, of the region of the target object is acquired based on the pre-established target object classification model, and the positioning key points are labelled for the target object picture based on the pre-trained target object key point positioning model. By labelling the positioning key point, a picture representing a target object content in the target object picture is positioned, so that the interference of a background content in the target object picture is reduced.

Embodiment II

This embodiment of the present disclosure provides a method for recognizing a picture, which comprises:

S010: acquiring a target object picture labelled with a positioning key point and a region of the target object.

In this embodiment, the target object picture labelled with the positioning key point and the region of the target object may be acquired by means of the method for labelling a picture provided by Embodiment I of the present disclosure.

S020: extracting, based on locations of the positioning key point and the region of the target object comprised in the acquired target object picture, at least one picture region representing a feature region from the target object picture.

In this embodiment, the extracted picture regions representing feature regions may be different based on different target objects. For example, when the target objects are clothes, the feature region may comprise a top region, a bottom region and other regions. When the target objects are the auto spare parts, the feature region may comprise an automotive head region, an automotive tail region and an automotive bottom region.

Typically, corresponding picture regions representing the feature regions may be extracted by acquiring a circumscribed figure (such as a circumscribed rectangle or circumscribed circle) constituted by the positioning key points of the target object picture or by connecting, in sequence, the positioning key points of the target object picture.

S030: acquiring feature information representing the feature region based on a region feature recognition model corresponding to the feature region.

In this embodiment, the recognized feature information may be information on type of the target object or information on attribute of the feature region of the target object or both.

For example, when the target objects are the auto spare parts, the recognized feature information may comprise categories of auto spare part such as front automotive lamps and automotive tyres, attribute information corresponding to the front automotive lamps (such as the number of the automotive lamps and shapes of the automotive lamps), and attribute information corresponding to the automotive tyres (such as tyre wall height or tyre tread width).

A feature region representing a feature of each target object needs to be extracted for the region of the target object and an attribute thereof. For this purpose, different region feature recognition models need to be trained for each feature region.

In the method for recognizing a picture provided by the embodiment of the present disclosure, first a picture region representing a feature region is extracted from a target object picture based on a region of the target object and a labelled positioning key point, and then feature information of the feature region is acquired based on a corresponding region feature recognition model. Therefore, compared with the prior art, the technical solutions of the present disclosure improve the accuracy and precision of recognizing the feature information of the target object in the picture.

Considering a fact that most users have requirements for acquiring clothes information in clothes pictures, in the embodiment of the present disclosure, a detailed description is made by taking an example in which the target object is clothes and the region of the target object specifically is the clothes wearing region.

A basic conception of the present disclosure is to provide a method for recognizing a clothes picture, a method for labelling a clothes picture, and an apparatus for implementing the method for recognizing a clothes picture and the method for labelling a clothes picture. A picture region representing a feature region in the clothes picture is extracted based on locations of positioning key points and the clothes wearing region in the clothes picture, and the picture region is inputted into a region feature recognition model corresponding to the feature region so as to accurately recognize the feature information of the feature region of the clothes picture, so that satisfactory clothes may be preferably selected from numerous clothes.

In general, the present disclosure relates to two aspects: in one aspect, a clothes wearing region is recognized from a clothes picture and a positioning key point is labelled for the clothes; and in the other aspect, a picture region embodying an attribute of the clothes is extracted based on the clothes wearing region and the labelled positioning key point, and a feature of each feature region of the clothes is recognized by means of a pre-trained region feature recognition model.

Recognizing a Clothes Wearing Region and Labelling a Positioning Key Point

In order to first recognize the clothes wearing region from the clothes picture, a clothes classification model configured to classify the clothes wearing region is pre-trained. The clothes classification model configured to classify the clothes wearing region is trained based on a first clothes picture training sample set for which the clothes wearing region is labelled in advance.

The clothes wearing region herein may comprise, but not limited to: tops, bottoms, split clothing and jumpsuits, etc. The clothes classification model may be a classification model based on a convolutional neural network.

Clothes positioning key points are predefined for each clothes wearing region. For example, for the tops, five positioning key points are defined, including two points at left and right shoulders, one point at collar, two points outside left and right lower hems of the tops. For the bottoms, four positioning key points may be defined, including two points outside left and right of waist and two points outside left and right lower hems of the bottoms. For split clothing, seven positioning key points may be defined, including two points at left and right shoulders, one point at collar, two points at left and right outside the tops and bottoms linking locations, and two points outside the left and right lower hems of the bottoms.

Similarly, a clothes key point positioning model configured to position/label positioning key points for a clothes picture may be trained according to a second clothes picture training sample set for which the positioning key points and the clothes wearing region are labelled in advance. In the existing image classification technologies, generally each classification task is separately trained (such as an upper body positioning model, a lower body positioning model and a whole body positioning model), which causes the trained models are excessive and not easy to optimize, making it more complicated for model training, maintenance and parameter optimization.

In addition, in the present disclosure, a single classification model based on a convolution neutral network is employed to train key point positioning models of multiple clothes wearing regions, and a training method is adopted, in which convolution parameters are shared at a bottom layer while only at a high layer are respective constrained parameters respectively and independently calculated. In this way, the objective of processing multiple tasks using a single model is implemented, the model parameter optimization size is reduced, the integral positioning precision is easier to optimize, and the forecasting speed may satisfy on-line forecasting requirements.

Specifically, a sample clothes picture for which the clothes wearing region has been labelled is acquired, the positioning key points are labelled for the sample clothes picture based on the clothes wearing region of the sample clothes picture, and the sample clothes picture for which the positioning key points have been labelled is trained using a preset convolutional neural network parameter matrix. In this way, the clothes key point positioning model corresponding to the sample clothes picture is obtained.

In addition, parameter features involved with the clothes classification model are associated with parameter features involved with the clothes key point positioning model. Therefore, the two models may be merged into one to implement classification of clothes and labelling of the positioning key points.

Recognition of Clothes Features

After recognizing the clothes wearing region from the clothes picture and determining the positioning key points of the clothes, the local region of the clothes picture with the key points positioned may be further recognized.

The manner for training the clothes category and attribute recognition model directly using the original clothes picture or face/body positioning technology is not high in precision, and is susceptible to interference of the background content. In the solutions proposed by the present disclosure, alignment processing is first performed on training data to be served as a sample using data of the clothes positioning key points, and then effective clothes picture contents in a plurality of regions (feature regions) delimited based on the labelled positioning key points are extracted for feature recognition. In this way, the recognition precision may be enhanced, and the adverse effect of the background region may be avoided.

Figure 7:
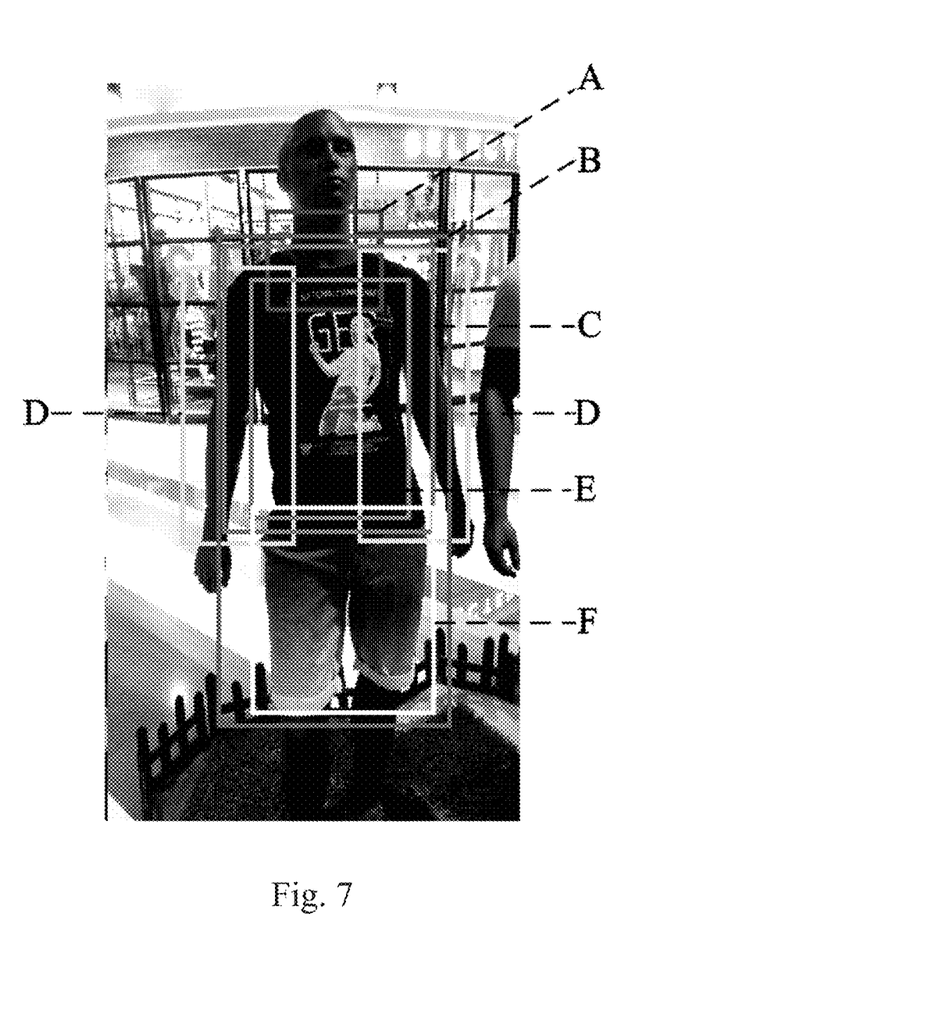
FIG. 7 is a schematic diagram illustrating an extractable feature region according to an exemplary embodiment of the present disclosure.

The feature region may comprise at least one of: an upper body region, a lower body region, a whole body region, a collar region, a chest region and a sleeve region, etc. FIG. 7 is a schematic diagram illustrating an extractable feature region according to an exemplary embodiment of the present disclosure.

The upper body region may be a circumscribed rectangle C defined by five positioning key points of the upper body. The lower body region may be a circumscribed rectangle F defined by four positioning key points of the lower body. The whole body region may be a circumscribed rectangle B defined by seven positioning key points of the whole body. The collar region may be a square A taking a positioning key point of the upper body corresponding to the collar as a center and half shoulder breadth as a length of side. The chest region may be a circumscribed rectangle E defined by four positioning key points of the upper body except the positioning key points corresponding to the neckline. The sleeve region may be a region D respectively taking a connecting line between the key point of the left shoulder and the key point of the lower hem of the left coat and a connecting line between the key point of the right shoulder and the key point of the lower hem of the right coat as a center line and half shoulder breadth as a width.

Corresponding feature regions are recognized using different models corresponding to each clothes wearing region. For example, when the clothes wearing region is the tops, the feature region comprises the upper body region, the collar region, the chest region and the sleeve region.

The recognized feature information may be information on clothes categories or information on attribute of the clothes feature region or both.

The feature region representing the feature of the clothes needs to be extracted for each clothes wearing region and the attribute thereof. For this purpose, different region feature recognition models need to be trained for each feature region. For example, for the collar region, a region feature recognition model for recognizing collar features is separately trained. The collar features comprise collar types such as round collar, square collar, heart-shaped collar, high collar and horizontal collar. Similarly, for the lower body region, a region feature recognition model for recognizing skirt types is separately trained, including recognizing skirt types such as A-line skirts, package hip skirts, tiered skirts and fishtail skirts and skirt lengths of short skirts, middle skirts and long skirts. Similarly, other region feature recognition models of each feature region are trained.

Table 1 illustrates examples of recognized clothes categories.

In concrete implementation of the present disclosure, daily common clothes may be divided based on attributes and attribute values of the feature regions, as shown in Table 2 and Table 3.

TABLE 2

List I of Clothes Attributes and Attribute Values

| Attribute/ Attribute value | Sleeve type | Skirt type | Pants type | Sleeve length | Clothes length |
|---|---|---|---|---|---|
| 1 | Flare sleeve | A-line skirts | Harem pants | No | Short |
| 2 | Puff sleeve | Package hip skirts | Flares | Short | Conventional |
| 3 | Lantern sleeve | Pleated skirts | Pencil pants | Elbow sleeve | Long |
| 4 | Ruffle sleeve | Tiered skirts | Straight-leg pants | Long sleeve | |
| 5 | Batwing sleeve | Fishtail skirts | Loose pants | | |

TABLE 3

List II of Clothes Attributes and Attribute Values

| Attribute/ Attribute value | Style | Style | Placket | Color | Collar type |
|---|---|---|---|---|---|
| 1 | Printing | Embroidering | Double-breasted | Red | Round collar |
| 2 | Pattern | Checks | Single-breasted | Orange | Stand collar |
| 3 | Slit | Dots | Zipper | Yellow | V-collar |
| 4 | Contrast color | Laces | Pockets | Green | Tailored collar |
| 5 | Stripes | Stripes | One button | Cyan | Horizontal collar |
| . . . | . . . | . . . | . . . | . . . | . . . |

Specifically, training the region feature recognition model may comprise: acquiring a picture region representing a feature region in a sample clothes picture; respectively labelling feature information for each picture region; and training the picture region for which the feature information has been labelled by using a preset convolutional neural network parameter matrix to obtain the region feature recognition model corresponding to the feature region.

It is to be pointed out that the picture training sample for training each of the region feature recognition models should be a sample picture of the extracted region feature and is subject to feature labelling so as to enhance the overall recognition precision of the trained model.

TABLE 1

Clothes Category Lists

| T shirts | Shirts | Sun-tops (vest) | Short coat | Wind coat (overcoat) | Waistcoat |
|---|---|---|---|---|---|
| Cotton-padded clothes (down jacket) | Fur | Fur clothing | Sweater (sports clothes) | Western-style clothes | Chiffon shirts |
| Knits (woolen sweater) | Jumpsuits | One-piece dress | Skirts | Polo shirts | Jackets |
| Underclothes | Autumn clothes | Nightclothes | Tang suit | Cheongsam | Wedding gown |
| Short pants | Jeans | Casual pants | Sweatpants | Suit pants (formal pants) | Formal dress |

The feature information of the clothes categories and attributes may be recognized from the provided clothes picture by means of the foregoing pre-trained clothes classification model, the clothes key point positioning model and the region feature recognition model.

Exemplary embodiments of the present disclosure are described in detail in the following with reference to the accompanying drawings.

Embodiment III

Figure 1:
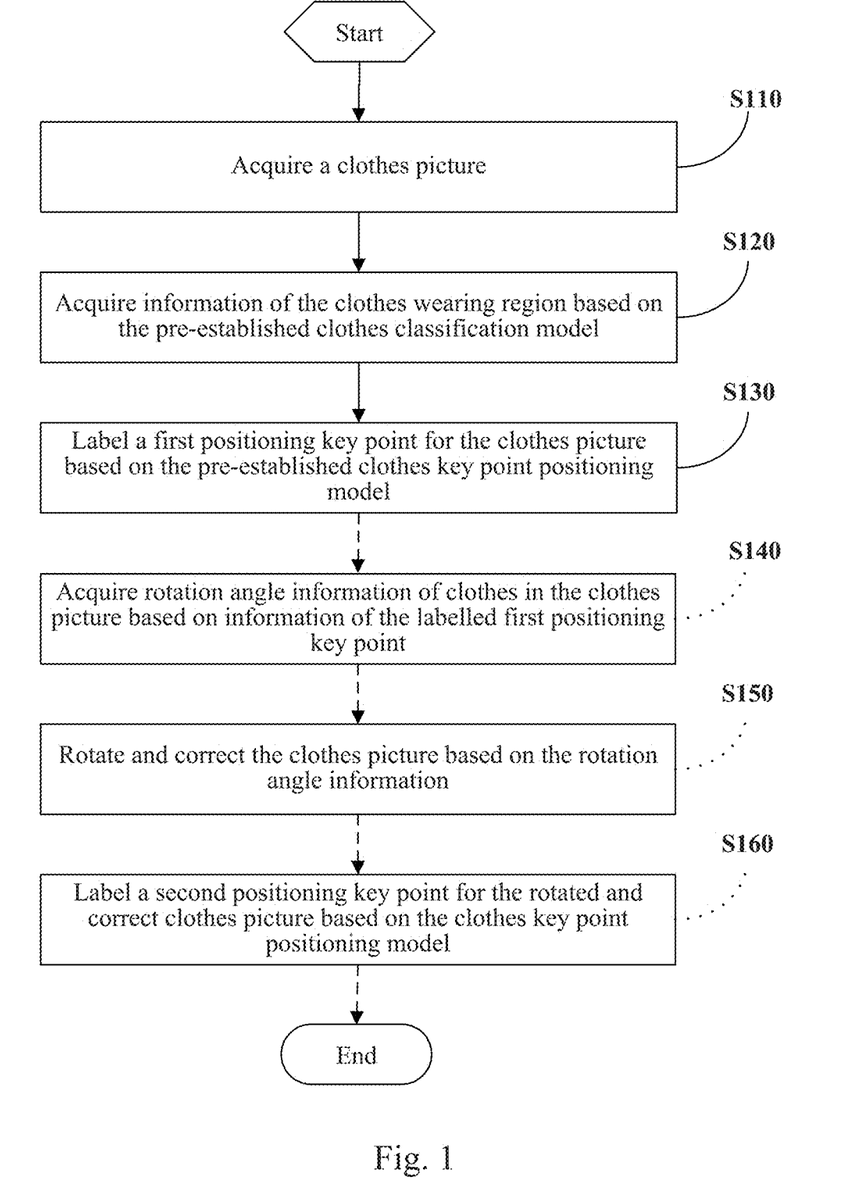
FIG. 1 is a schematic flow chart illustrating a method for labelling a clothes picture according to an exemplary embodiment of the present disclosure.
Figure 6:
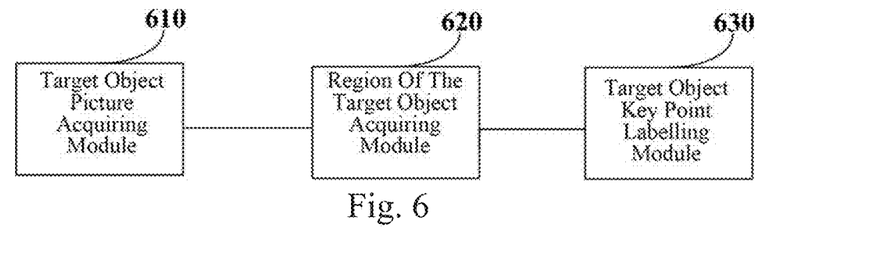
FIG. 6 is a schematic structural diagram illustrating an apparatus for labelling a picture according to an exemplary embodiment of the present disclosure.

FIG. 1 is a schematic flow chart illustrating a method for labelling a clothes picture according to an exemplary embodiment of the present disclosure. For example, the method for labelling a clothes picture may be performed by an apparatus as shown in FIG. 6.

Referring to FIG. 1, a clothes picture is acquired in Step S110.

Specifically, the clothes picture may be a clothes picture acquired by the user by way of photographing, or may be a clothes picture on the network or various storage media.

In Step S120, information of the clothes wearing region in the clothes picture is acquired based on the pre-established clothes classification model as previously mentioned.

As previously mentioned, the clothes wearing region divided by the clothes classification model may comprise, but not limited to, tops, bottoms, split clothing and jumpsuits, etc.

Optionally, the clothes classification model is a clothes classification model established based on a convolutional neural network.

In Step S130, a first positioning key point is labelled for the clothes picture based on the pre-established clothes key point positioning model as previously mentioned.

For example, for a clothes picture determined as the tops, five first positioning key points as previously mentioned may be labelled. For the bottoms, four first positioning key points may be labelled.

In the method for labelling a clothes picture provided by the embodiment of the present disclosure, information of the clothes wearing region in the clothes picture is acquired based on the pre-established clothes classification model, and the positioning key point is labelled for the clothes picture based on the pre-trained clothes key point positioning model. By labelling the first positioning key point, a picture representing a clothes content in the clothes picture is positioned, so that the interference of a background content in the clothes picture is reduced.

According to a preferred embodiment of the present disclosure, the method for labelling a clothes picture of the embodiment of the present disclosure may further comprise Steps S140~S160.

In Step S140, rotation angle information of clothes in the clothes picture is acquired based on information of the labelled first positioning key point.

Specifically, after obtaining the information of the labelled first positioning key point, an angle, between a center line along a height direction and a vertical direction, of the first positioning key point may be calculated, and the angle is determined as the rotation angle information. It is to be understood that the first positioning key point actually labelled may likely be asymmetric, and thus an error is allowable here.

In Step S150, the clothes picture is rotated and corrected based on the rotation angle information.

Specifically, after obtaining the rotation angle information, the clothes picture is rotated clockwise or anticlockwise to obtain the rotated and corrected clothes picture. It is unnecessary to rotate or correct the clothes picture when the rotation angle is zero.

In Step S160, a second positioning key point is labelled for the rotated and corrected clothes picture based on the clothes key point positioning model.

Specifically, when obtaining the rotated and corrected clothes picture, the second positioning key point is labelled for the clothes picture based on the clothes key point positioning model. After correcting and relabelling the clothes picture, interference of the background content in the clothes picture may be further reduced, ensuring the location of the labelled second positioning key point to be more accurate.

Figure 2:
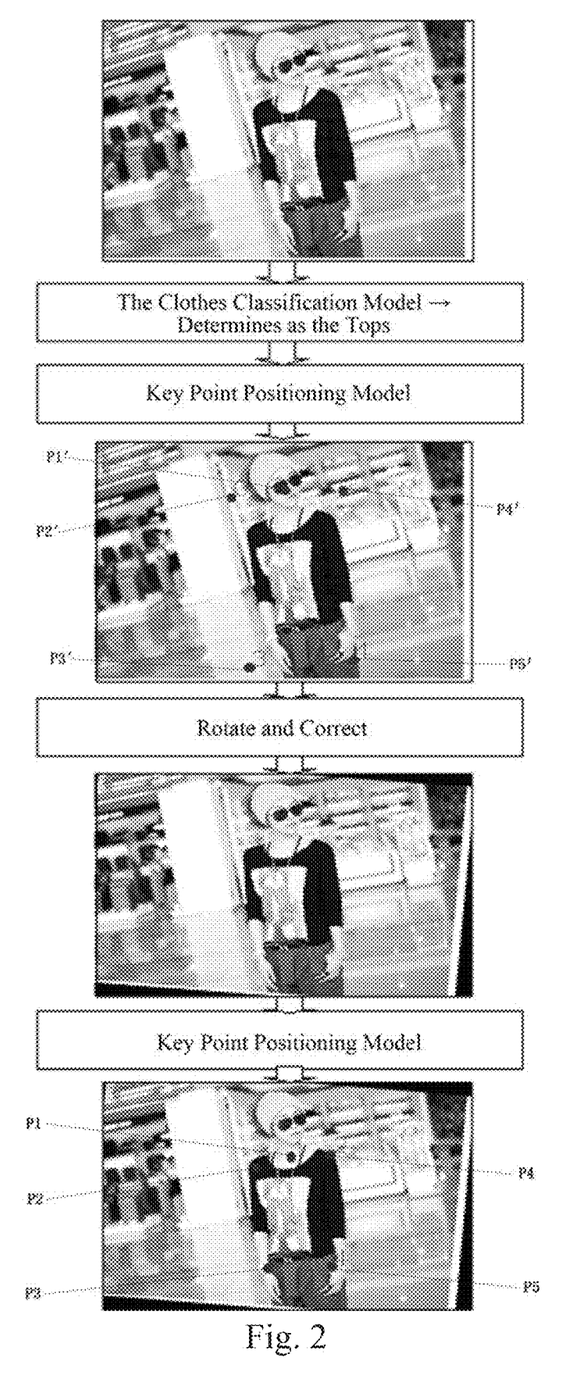
FIG. 2 is a schematic flow chart illustrating positioning key points labelling a clothes picture.

The technical solutions of the method for labelling a clothes picture of the present disclosure are described in the following by taking FIG. 2 as an example. FIG. 2 is a schematic flow chart illustrating positioning key points labelling a clothes picture. Specifically, after acquiring the clothes picture, information of the clothes wearing region (tops) in the clothes picture is first acquired based on the pre-established clothes classification model (a clothes classification model established based on the convolutional neural network), and then the clothes picture and the information of the clothes wearing region (tops) are inputted into the clothes key point positioning model to label the first positioning key points for the clothes picture. In this way, information of the five first positioning key points (P1', P2', P3', P4' and P5') of the clothes picture is obtained. Afterward, rotation angle information of the clothes picture is acquired based on the previously obtained location information of the first positioning key points, and the clothes picture is rotated and corrected based on the rotation angle information. Finally, the rotated and corrected clothes picture and the information of the clothes wearing region are again inputted into the clothes key point positioning model to label second positioning key points for the clothes picture so as to obtain more accurate information of the second positioning key points (P1, P2, P3, P4 and P5) of the clothes picture.

Embodiment IV

Figure 3:
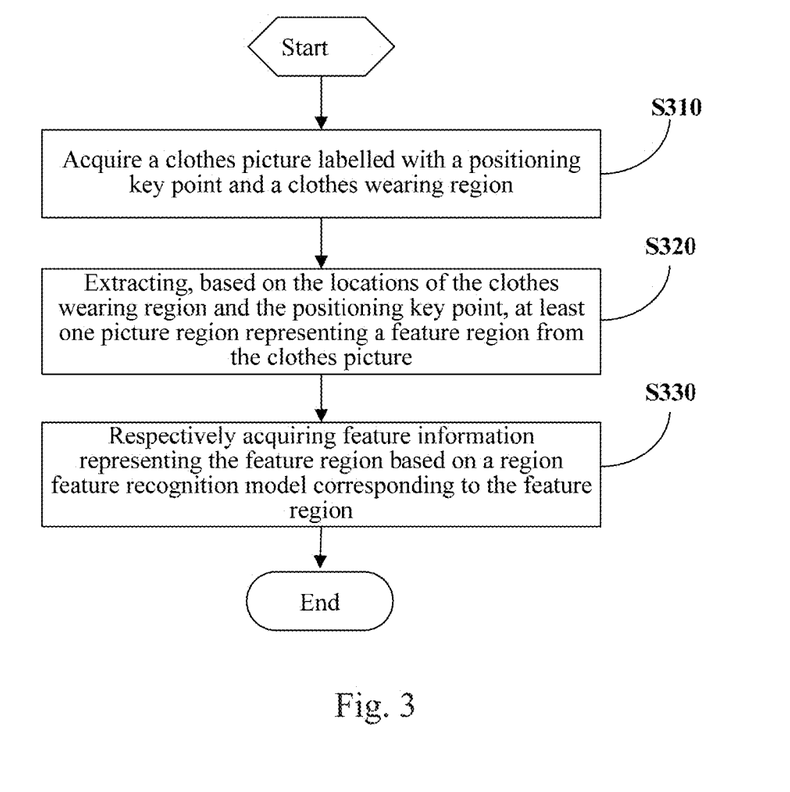
FIG. 3 is a schematic flow chart illustrating a method for recognizing a clothes picture according to an exemplary embodiment of the present disclosure.
Figure 5:
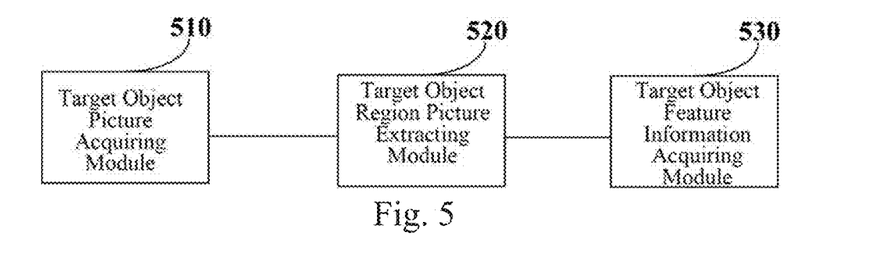
FIG. 5 is a schematic structural diagram illustrating an apparatus for recognizing a picture according to an exemplary embodiment of the present disclosure.

FIG. 3 is a schematic flow chart illustrating a method for recognizing a clothes picture according to an exemplary embodiment of the present disclosure. For example, the method for recognizing a clothes picture may be performed by an apparatus as shown in FIG. 5.

Referring to FIG. 3, in Step S310, the previously-mentioned clothes picture labelled with the positioning key points and the clothes wearing region is acquired.

The positioning key points may be the foregoing first positioning key points or second positioning key points.

In Step S320, at least one picture region representing a feature region is extracted from the clothes picture based on locations of the positioning key points and the clothes wearing region.

Optionally, the feature region may comprise, but not limited to at least one of: an upper body region, a lower body region, a whole body region, a collar region, a chest region and a sleeve region.

Specifically, the feature region is determined based on the clothes wearing region. For example, when the clothes wearing region is the tops, the feature region comprises the upper body region, the collar region, the chest region and the sleeve region. For another example, when the clothes wearing region is pants, the feature region is the lower body region.

Afterward, a picture region representing a feature region in the clothes picture is extracted based on the locations of the positioning key points. For example, when the clothes wearing region is the tops, it can be known that the feature region comprises the upper body region, the collar region, the chest region and the sleeve region. The picture region of the upper body region may be extracted based on the locations of five positioning key points labelled. The picture region of the collar region may be determined and extracted based on the location of the positioning key point at collar. The picture region of the chest region may be determined and extracted based on the locations of the positioning key points at left and right shoulders and left and right lower hems. The picture region of the sleeve region may be determined and extracted based on the locations of the positioning key points at left and right shoulders and left and right lower hems.

During extracting the picture region representing a feature region in the clothes picture, the picture region of the feature region may be extracted based on a rectangular region only containing the positioning key points corresponding to each feature region. For example, when determining the picture region corresponding to the collar region, the picture region corresponding to the collar region may be extracted only based on a rectangular region containing the positioning key point at collar.

It is to be understood that in concrete implementation of the present disclosure, a rectangular region only containing the positioning key points corresponding to each feature region may be limited. For example, the minimum vertical distance (which may be zero) from four sides of the rectangular region to the outermost key point within the rectangular region is limited so that the extracted picture region is more accurate.

In Step S330, feature information representing the feature region is acquired based on a region feature recognition model corresponding to the feature region.

Specifically, each extracted picture region is respectively inputted into the region feature recognition model corresponding to the feature region represented by the picture region to acquire the feature information of the feature region.

The feature information may comprise information on a clothes category and/or an attribute of the feature region.

Different feature information will be obtained in Step S330 based on different picture regions extracted in Step S320 and different region feature recognition models corresponding to the picture regions. For example, when the clothes pictures are recognized as the tops, the picture region of the upper body region is inputted into the region feature recognition model corresponding to the upper body region to obtain clothes category (T shirts, shirts and the like) information of the upper body region. The picture region representing the collar region is inputted into the region feature recognition model corresponding to the collar region to obtain the attribute (collar type) information of the collar region. In a similar way, the attribute (color, style and the like) information of the chest region and the attribute (sleeve type, sleeve length and the like) information of the sleeve region will be obtained. For another example, in the event that the clothes wearing region in the clothes picture is the bottoms, the picture region representing the lower body region is inputted into the region feature recognition model corresponding to the lower body region to obtain clothes category (jeans, casual pants and the like) and clothes attribute (pants type, clothes length and the like) information of the lower body region.

The recognized clothes category may be, but not limited to shirts, T shirts, cotton-padded clothes, western-style clothes, jumpsuits, jeans, casual pants, shorts, autumn clothes, formal clothes and the like. In concrete implementation of the present disclosure, daily common clothes may be divided according to categories as shown in Table 1.

The recognized attribute of the feature region comprises at least one of: a clothes type, a skirt type, a pants type, a collar type, a sleeve type, a clothes length, a skirt length, a pants length and a sleeve length. It is to be understood that the attribute of the feature region may further comprise other attributes such as color. Each attribute has an attribute value.

Figure 4:
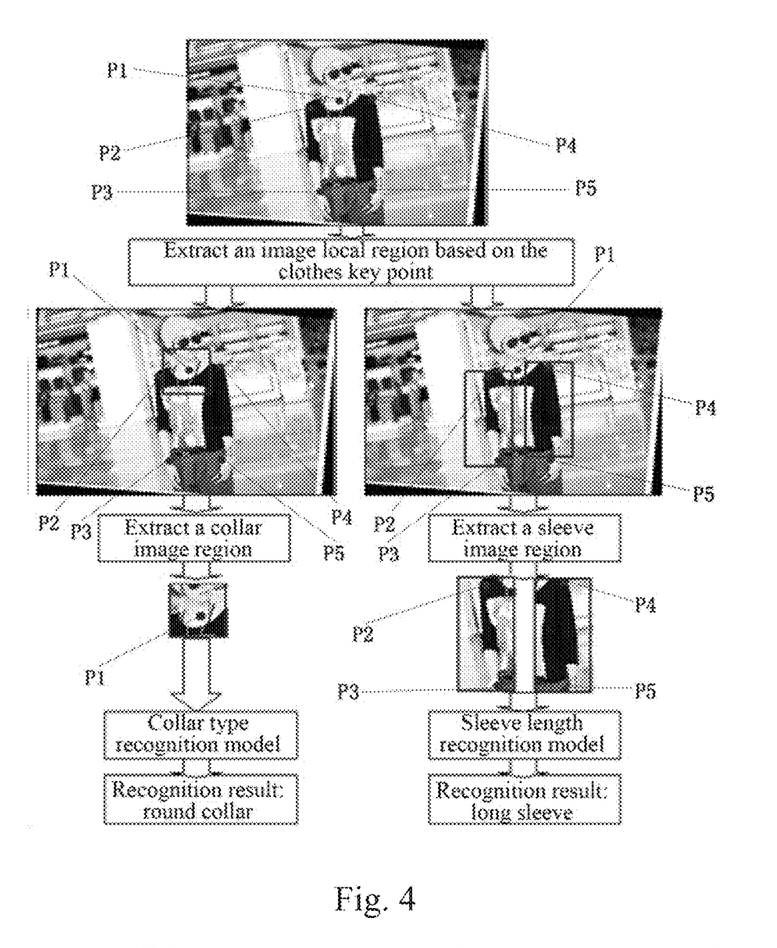
FIG. 4 illustrates a schematic flowchart of recognizing a collar type and a sleeve length of a clothes picture.

The technical solutions of the method for recognizing a clothes picture of the present disclosure are described in the following by taking FIG. 4 as an example. FIG. 4 illustrates a schematic flow chart of recognizing a collar type and a sleeve length of a clothes picture. Specifically, after clothes pictures labelled with the positioning key points and the clothes wearing regions are acquired, the picture region (a square region taking the positioning key point P1 at collar as the center and half shoulder breadth as the side length) corresponding to the collar region and the picture region (a rectangle region in which the left sleeve uses a connecting line between the positioning key point P2 at the left shoulder and the positioning key point P3 outside the left lower hem as a center line and half shoulder breadth as a side length; or a rectangle region in which the right sleeve uses a connecting line between the positioning key point P4 at the right shoulder and the positioning key point P5 outside the right lower hem as a center line and half shoulder breadth as a side length) corresponding to the sleeve region are first determined based on the clothes wearing region (the tops) in the clothes picture and the locations of the positioning key points (P1, P2, P3, P4 and P5), and then corresponding picture regions are extracted. After the extraction, the picture region corresponding to the collar region is inputted into a collar type region feature recognition model to obtain feature information indicating that the collar type is a round collar; and the picture region corresponding to the sleeve region is inputted into a sleeve length region feature recognition model to obtain feature information indicating that the sleeve length is a long sleeve.

In the method for recognizing a clothes picture provided by the embodiments of the present disclosure, first a picture region representing a feature region is extracted from a clothes picture based on a clothes wearing region and labelled positioning key points, and then feature information on the feature region is acquired based on a corresponding region feature recognition model. Therefore, compared with the prior art, the technical solutions of the present disclosure improve the accuracy and precision of recognizing the feature information on clothes in the clothes picture.

Embodiment V

FIG. 5 is a schematic structural diagram illustrating an apparatus for recognizing a picture according to an exemplary embodiment of the present disclosure.

Referring to FIG. 5, the apparatus for recognizing a picture according to the embodiment of the present disclosure may comprise: a target object picture acquiring module 510, a target object region picture extracting module 520 and a target object feature information acquiring module 530.

The target object picture acquiring module 510 is configured to acquire a target object picture labelled with a positioning key point and a region of the target object.

The target object region picture extracting module 520 is configured to extract, based on locations of the positioning key point and the region of the target object comprised in the acquired target object picture, at least one picture region representing a feature region from the target object picture.

The target object feature information acquiring module 530 is configured to acquire feature information representing the feature region based on a region feature recognition model corresponding to the feature region.

In the apparatus for recognizing a picture provided by the embodiment of the present disclosure, first a picture region representing a feature region is extracted from a target object picture based on a region of the target object and a labelled positioning key point, and then feature information of the feature region is acquired based on a corresponding region feature recognition model. Therefore, compared with the prior art, the technical solutions of the present disclosure improve the accuracy and precision of recognizing the feature information of the target object in the picture.

Optionally, the target object is clothes, and the region of the target object is a clothes wearing region.

Optionally, the target object picture acquiring module 510 is specifically configured to acquire a clothes picture labelled with a positioning key point and a clothes wearing region.

The target object region picture extracting module 520 is specifically configured to extract, based on locations of the positioning key point and the clothes wearing region, at least one picture region representing a feature region from the clothes picture.

The target object feature information acquiring module 530 is specifically configured to acquire feature information representing the feature region based on a region feature recognition model corresponding to the feature region.

When the target object is clothes and the region of the target object is the clothes wearing region, the apparatus for recognizing a picture is specifically optimized to be the apparatus for recognizing a clothes picture. Optionally, the feature information comprises a clothes type and/or an attribute of the feature region.

Optionally, the clothes category may be shirts, T shirts, cotton-padded clothes, western-style clothes, jumpsuits, jeans, casual pants, or shorts.

Optionally, the attribute of the feature region comprises at least one of: a clothes type, a skirt type, a pants type, a collar type, a sleeve type, a clothes length, a skirt length, a pants length and a sleeve length.

Optionally, the feature region comprises at least one of: an upper body region, a lower body region, a whole body region, a collar region, a chest region and a sleeve region.

The apparatus for recognizing a clothes picture provided by the embodiments of the present disclosure first extracts a picture region representing a feature region from a clothes picture based on a clothes wearing region and a labelled positioning key point, and then acquires feature information about the feature region based on a corresponding region feature recognition model. Therefore, compared with the prior art, the technical solutions of the present disclosure improve the accuracy and precision of recognizing the feature information about clothes in the clothes picture.

Embodiment 6

FIG. 6 is a schematic structural diagram illustrating an apparatus for labelling a picture according to an exemplary embodiment of the present disclosure.

Referring to FIG. 6, the apparatus for labelling a picture according to the embodiment of the present disclosure may comprise: a target object picture acquiring module 610, a region of the target object acquiring module 620 and a target object key point labelling module 630.

The target object picture acquiring module 610 is configured to acquire a target object picture.

The region of the target object acquiring module 620 is configured to acquire information, in the target object picture, of a region of the target object based on a pre-established target object classification model.

The target object key point labelling module 630 is configured to label a positioning key point for the target object picture based on a pre-established target object key point positioning model.

The apparatus for labelling a picture provided by the embodiment of the present disclosure acquires information, in the target object picture, of the region of the target object based on the pre-established target object classification model, and labels the positioning key point for the target object picture based on the pre-trained target object key point positioning model. By labelling the positioning key point, a picture representing a target object content in the target object picture is positioned, so that the interference of a background content in the target object picture is reduced.

Optionally, the target object is clothes, and the region of the target object is a clothes wearing region.

Optionally, the target object picture acquiring module 610 is specifically configured to acquire a clothes picture.

The region of the target object acquiring module 620 is specifically configured to acquire information of a clothes wearing region in the clothes picture based on a pre-established clothes classification model.

The target object key point labelling module 630 is specifically configured to label a first positioning key point for the clothes picture based on a pre-established clothes key point positioning model.

When the target object is clothes and the region of the target object is the clothes wearing region, the apparatus for labelling a picture is specifically optimized to be the apparatus for labelling a clothes picture.

Optionally, the apparatus for labelling a clothes picture may further comprise: a rotation angle feature information acquiring unit, configured to acquire rotation angle information of clothes in the clothes picture based on information of the labelled first positioning key point; a rotating and correcting unit, configured to rotate and correct the clothes picture based on the rotation angle information; and a second key point labelling unit, configured to label a second positioning key point for the rotated and corrected clothes picture based on the clothes key point positioning model.

Optionally, the clothes wearing region divided by the clothes classification model comprise tops, bottoms, split clothing and jumpsuits.

Optionally, the clothes classification model is a clothes classification model established based on a convolutional neural network.

The apparatus for labelling a clothes picture provided by the embodiment of the present disclosure acquires information of the clothes wearing region in the clothes picture based on the pre-established clothes classification model, and labels the positioning key point for the clothes picture based on the pre-trained clothes key point positioning model. By labelling the positioning key point, a picture representing a clothes content in the clothes picture is positioned, so that the interference of a background content in the clothes picture is reduced.

Embodiment 7

This embodiment provides a non-volatile computer storage medium. The computer storage medium stores one or more modules. When the one or more modules are performed by a device for executing the method for recognizing a picture, the device is caused to:

acquire a target object picture labelled with a positioning key point and a region of the target object;

extract, based on locations of the positioning key point and the region of the target object comprised in the acquired target object picture, at least one picture region representing a feature region from the target object picture; and acquire feature information representing the feature region based on a region feature recognition model corresponding to the feature region.

When the module stored in the storage medium is performed by the device, the target object is clothes, and the region of the target object is the clothes wearing region.

When the module stored in the storage medium is performed by the device, the method specifically comprises:

acquiring a clothes picture labelled with a positioning key point and a clothes wearing region;

extracting, based on locations of the clothes wearing region and the positioning key point, at least one picture region representing a feature region from the clothes picture; and acquiring feature information representing the feature region based on a region feature recognition model corresponding to the feature region.

When the module stored in the storage medium is performed by the device, the feature information comprises information on a clothes type and/or an attribute of the feature region.

When the module stored in the storage medium is performed by the device, the attribute of the feature region comprises at least one of: a clothes type, a skirt type, a pants type, a collar type, a sleeve type, a clothes length, a skirt length, a pants length and a sleeve length.

When the module stored in the storage medium is performed by the device, the feature region comprises at least one of: an upper body region, a lower body region, a whole body region, a collar region, a chest region and a sleeve region.

Embodiment 8

This embodiment provides a non-volatile computer storage medium. The computer storage medium stores one or more modules. When the one or more modules are performed by a device for executing a method for recognizing a picture, the device is caused to:

acquire a target object picture;

acquire information, in the target object picture, of a region of the target object based on a pre-established target object classification model; and label a positioning key point for the target object picture based on a pre-established target object key point positioning model.

When the module stored in the storage medium is performed by the device, the target object is clothes, and the region of the target object is the clothes wearing region.

When the module stored in the storage medium is performed by the device, the method specifically comprises:

acquiring a clothes picture;

acquiring information of the clothes wearing region in the clothes picture based on the pre-established clothes classification model; and labelling a first positioning key point for the clothes picture based on the pre-established clothes key point positioning model.

When the module stored in the storage medium is performed by the device, the method further comprises:

acquiring rotation angle information of clothes in the clothes picture based on information of the labelled first positioning key point;

rotating and correcting the clothes picture based on the rotation angle information; and labelling a second positioning key point for the rotated and corrected clothes picture based on the clothes key point positioning model.

When the module stored in the storage medium is performed by the device, the clothes wearing region divided by the clothes classification model comprises tops, bottoms, split clothing and jumpsuits.

When the module stored in the storage medium is performed by the device, the clothes classification model is a clothes classification model established based on a convolutional neural network.

Embodiment IX

Figure 8:
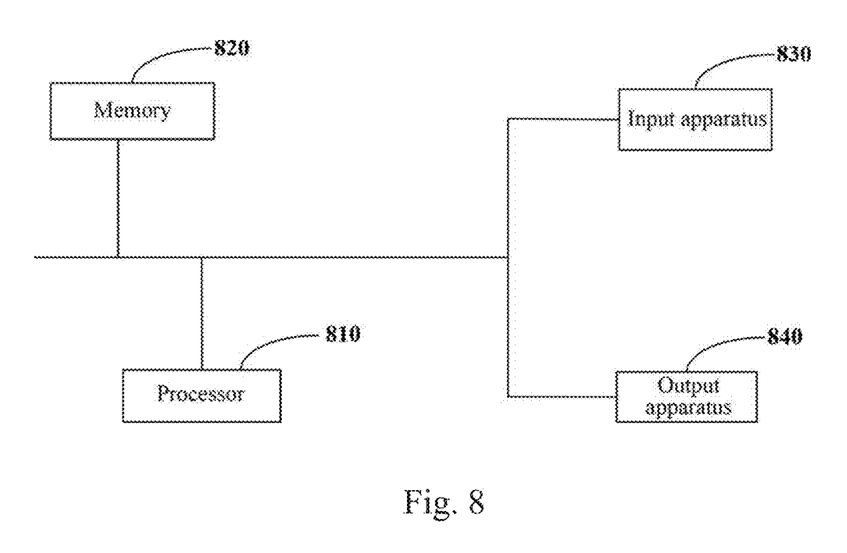
FIG. 8 is a schematic diagram illustrating hardware structure of a device according to an exemplary embodiment of the present disclosure.

FIG. 8 is a schematic diagram of a hardware structure of a device according to Embodiment IX of the present disclosure.

The device comprises:

one or more processors 810, in FIG. 8 one processor 810 being taken as an example;

a memory 820; and one or more modules.

The device may further comprise: an input apparatus 830 and an output apparatus 840. The processor 810, the memory 820, the input apparatus 830 and the output apparatus 840 in the device may be connected by means of a bus or in other ways, in FIG. 5 connecting by means of a bus is taken as an example.

As a computer readable storage medium, the memory 820 may be configured to store software programs, computer executable programs and modules, for example, program instructions/modules (such as a first clothes picture acquiring unit 510, a region picture extracting unit 520 and a feature information acquiring unit 530 as shown in FIG. 5) corresponding to the method for recognizing a picture in the embodiments of the present disclosure or program instructions/modules (such as a second clothes picture acquiring unit 610, a wearing region acquiring unit 620 and a first key point labelling unit 630 as shown in FIG. 6) corresponding to the method for labelling a picture in the embodiments of the present disclosure. The processor 810 may execute various function applications and data processing of a server, namely implement the method for drawing a navigation picture in the foregoing method embodiments by running the software programs, instructions and modules stored in the memory 820.

The memory 820 may include a program storage area and a data storage area, where the program storage area may store an operating system, application programs required for at least one function; and the data storage area may store data created according to the use of a terminal device. Besides, the memory 820 may include a high speed random access memory, or further include a non-volatile memory, for example, at least one magnetic disk storage device, a flash memory, or other non-volatile solid-state storage devices. In some embodiments, the memory 820 may further comprise memories disposed remotely relative to the processor 810, and these remote memories may be connected to a terminal device via the network. Instances of the foregoing networks include but are not limited to the Internet, the Intranet, a local area network (LAN), a mobile communication network and a combination thereof.

The input apparatus 830 may be configured to receive inputted numerical or character information to generate key signal inputs related to user settings and function control a terminal. The output apparatus 840 may include a display device such as a display screen.

The one or more modules are stored in the memory 820, and when being executed by the one or more processors 810, the one or more modules are caused to:

acquire a target object picture labelled with a positioning key point and a region of the target object;

extract, based on locations of the positioning key point and the region of the target object comprised in the acquired target object picture, at least one picture region representing a feature region from the target object picture; and acquire feature information representing the feature region based on a region feature recognition model corresponding to the feature region.

Optionally, the target object is clothes, and the region of the target object is a clothes wearing region.

Optionally, the method specifically comprises: acquiring a clothes picture labelled with a positioning key point and a clothes wearing region; extracting, based on locations of the clothes wearing region and the positioning key point, at least one picture region representing a feature region from the clothes picture; and respectively acquiring feature information representing the feature region based on a region feature recognition model corresponding to the feature region.

Optionally, the feature information comprises information on a clothes type and/or an attribute of the feature region.

Optionally, the attribute of the feature region comprises at least one of: a clothes type, a skirt type, a pants type, a collar type, a sleeve type, a clothes length, a skirt length, a pants length and a sleeve length.

Optionally, the feature region comprises at least one of: an upper body region, a lower body region, a whole body region, a collar region, a chest region and a sleeve region.

Alternatively, when being executed by the one or more processors 810, the one or more modules are caused to:

acquire a target object picture;

acquire information, in the target object picture, of a region of the target object based on a pre-established target object classification model; and label a positioning key point for the target object picture based on a pre-established target object key point positioning model.

Optionally, the target object is clothes, and the region of the target object is a clothes wearing region.

Optionally, the method specifically comprises: acquiring a clothes picture; acquiring information of the clothes wearing region in the clothes picture based on a pre-established clothes classification model; and labelling a first positioning key point for the clothes picture based on a pre-established clothes key point positioning model.

Optionally, the method further comprises: acquiring rotation angle information of clothes in the clothes picture based on information of the labelled first positioning key point; rotating and correcting the clothes picture based on the rotation angle information; and labelling a second positioning key point for the rotated and corrected clothes picture based on the clothes key point positioning model.

Optionally, the clothes wearing region divided by the clothes classification model comprises tops, bottoms, split clothing and jumpsuits.

Optionally, the clothes classification model is a clothes classification model established based on a convolutional neural network.

It is to be pointed out that according to requirements for implementation, each step as described in the present disclosure may be divided into more substeps, or two or more steps or part operation of steps may be combined into a new step to implement the objective of the present disclosure.

The above-described methods according to the present disclosure can be implemented in hardware, firmware or as software or computer code that can be stored in a recording medium (such as a CD ROM, a RAM, a floppy disk, a hard disk, or a magneto-optical disk) or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware (such as an ASIC or FPGA). It is to be understood that the computer, the processor, microprocessor controller or the programmable hardware include memory components (such as RAM, ROM and Flash) that may store or receive software or computer code that when accessed and executed by the computer, processor or hardware implement the processing methods described herein. In addition, when a general purpose computer accesses code for implementing the processing shown herein, the execution of the code transforms the general purpose computer into a special purpose computer for executing the processing shown herein.

The abovementioned embodiments are merely the embodiments of the present disclosure, but the protection scope of the present disclosure is not limited thereto. Any variation or substitution easily conceivable to a person of ordinary skills in the art within the technical scope disclosed in the present disclosure shall fall into the protection scope of the present disclosure. Therefore, the protection scope of the present disclosure shall be subject to the protection scope of the claims.

What is claimed is:

1. A method for recognizing a picture, comprising:
defining a positioning region enclosing a segment of a target object, the positioning region having a predetermined shape and a predetermined size;
defining a point located in the positioning region as a positioning key point corresponding to the positioning region, the positioning key point and the positioning region having a predefined position relationship;
acquiring a target object picture labelled with the positioning key point and a region of the target object,
determining a location of the positioning key point in the target object picture;
determining a region having the predetermined shape, the predetermined size, and the predefined position relationship with the positioning key point in the target object picture, as the positioning region corresponding to the labelled positioning key point based on location of the labelled positioning key point;
extracting the positioning region in the target object picture; and
acquiring feature information representing the positioning region based on a region feature recognition model corresponding to the segment enclosed by the positioning region.

2. The method according to claim 1, wherein the target object is clothes, and the region of the target object is a clothes wearing region.

3. The method according to claim 2, wherein the predefined position relationship comprises: for an upper portion of the clothes wearing region, two positioning key points on left and right shoulders, one point at collar, and two points outside left and right lower hems.

4. The method according to claim 3, wherein the feature information comprises information on a clothes type and/or an attribute of the feature region.

5. The method according to claim 4, wherein the attribute of the feature region comprises at least one of:
a clothes type, a skirt type, a pants type, a collar type, a sleeve type, a clothes length, a skirt length, a pants length and a sleeve length.

6. The method according to claim 3, wherein the feature region comprises at least one of:
an upper body region, a lower body region, a whole body region, a collar region, a chest region and a sleeve region.

7. A method for labelling a picture, comprising:
acquiring a target object picture;
acquiring, based on a pre-established target object classification model, information of a region of a target object from the target object picture; and
labelling a positioning key point for the target object picture based on a pre-established target object key point positioning model, wherein the pre-established target object key point positioning model defines a positioning region enclosing a segment of the target object, the positioning region having a predetermined shape and a predetermined size, and defines a point located in the positioning region as the positioning key point corresponding to the positioning region, the positioning key point and the positioning region having a predefined position relationship.

8. The method according to claim 7, wherein the target object is clothes, and the region of the target object is a clothes wearing region.

9. The method according to claim 8, wherein the method specifically comprises:
acquiring a clothes picture;
acquiring information of the clothes wearing region in the clothes picture based on a pre-established clothes classification model; and
labelling a first positioning key point for the clothes picture based on a pre-established clothes key point positioning model.

10. The method according to claim 9, wherein the method further comprises:
acquiring rotation angle information of the clothes in the clothes picture based on information of the labelled first positioning key point;
rotating and correcting the clothes picture based on the rotation angle information; and
labelling a second positioning key point for the rotated and corrected clothes picture based on the clothes key point positioning model.

11. The method according to claim 9, wherein the clothes wearing region divided by the clothes classification model comprises tops, bottoms, split clothing and jumpsuits.

12. The method according to claim 9, wherein the clothes classification model is a clothes classification model established based on a convolutional neural network.

13. An apparatus for recognizing a picture, comprising:
a target object picture acquiring module, configured to acquire a target object picture labelled with a positioning key point and a region of the target object, wherein a positioning region enclosing a segment of the target object is defined, the positioning region having a predetermined shape and a predetermined size, and a point located in the positioning region is defined as the positioning key point corresponding to the positioning region, the positioning key point and the positioning region having a predefined position relationship;
a target object region picture extracting module, configured to determine a location of the positioning key point in the target object picture; determine a region having the predetermined shape, the predetermined size, and the predefined position relationship with the positioning key point in the target object picture, as the positioning region corresponding to the labelled positioning key point based on location of the labelled positioning key point and extract the positioning region in the target object picture; and
a target object feature information acquiring module, configured to acquire feature information representing the positioning region based on a region feature recognition model corresponding to the segment enclosed by the positioning region.

14. The apparatus according to claim 13, wherein the target object is clothes, and the region of the target object is a clothes wearing region.

15. The apparatus according to claim 14, wherein
the target object picture acquiring module is specifically configured to acquire a clothes picture labelled with a positioning key point and a clothes wearing region;
the target object region picture extracting module is specifically configured to extract, based on locations of the positioning key point and the clothes wearing region, at least one picture region representing a feature region from the clothes picture; and
the target object feature information acquiring module is specifically configured to respectively acquire feature information representing the feature region based on a region feature recognition model corresponding to the feature region.

16. The apparatus according to claim 15, wherein the feature information comprises information on a clothes type and/or an attribute of the feature region.

17. The apparatus according to claim 16, wherein the attribute of the feature region comprises at least one of:
a clothes type, a skirt type, a pants type, a collar type, a sleeve type, a clothes length, a skirt length, a pants length and a sleeve length.

18. The apparatus according to claim 15, wherein the feature region comprises at least one of:
an upper body region, a lower body region, a whole body region, a collar region, a chest region and a sleeve region.

19. An apparatus for labelling a picture, comprising:
a target object picture acquiring module, configured to acquire a target object picture;
a region of the target object acquiring module, configured to acquire information, in the target object picture, of a region of the target object based on a pre-established target object classification model; and
a target object key point labelling module, configured to label a positioning key point for the target object picture based on a pre-established target object key point positioning model, wherein the pre-established target object key point positioning model defines a positioning region enclosing a segment of the target object, the positioning region having a predetermined shape and a predetermined size, and defines a point located in the positioning region as the positioning key point corresponding to the positioning region, the positioning key point and the positioning region having a predefined position relationship.

20. The apparatus according to claim 19, wherein the target object is clothes, and the region of the target object is a clothes wearing region.

21. The apparatus according to claim 20, wherein
the target object picture acquiring module is specifically configured to acquire a clothes picture;
the region of the target object acquiring module is specifically configured to acquire information of the clothes wearing region in the clothes picture based on a pre-established clothes classification model; and
the target object key point labelling module is specifically configured to label a first positioning key point for the clothes picture based on a pre-established clothes key point positioning model.

22. The apparatus according to claim 21, wherein the apparatus further comprises:
a rotation angle feature information acquiring unit, configured to acquire rotation angle information of the clothes in the clothes picture based on information of the labelled first positioning key point;
a rotating and correcting unit, configured to rotate and correct the clothes picture based on the rotation angle information; and
a second key point labelling unit, configured to label a second positioning key point for the rotated and corrected clothes picture based on the clothes key point positioning model.

23. The apparatus according to claim 21, wherein the clothes wearing region divided by the clothes classification model comprises tops, bottoms, split clothing and jumpsuits.

24. A non-volatile computer storage medium, storing one or more modules, wherein when the one or more modules are performed by a device for executing a method for recognizing a picture, the device is caused to:
define a positioning region enclosing a segment of a target object, the positioning region having a predetermined shape and a predetermined size;
define a point located in the positioning region as a positioning key point corresponding to the positioning region, the positioning key point and the positioning region having a predefined position relationship;
acquire a target object picture labelled with a positioning key point and a region of the target object;
determining a location of the positioning key point in the target object picture;
determining a region having the predetermined shape, the predetermined size, and the predefined position relationship with the positioning key point in the target object picture, as the positioning region corresponding to the labelled positioning key point based on location of the labelled positioning key point;
extracting the positioning region in the target object picture; and
acquire feature information representing the positioning region based on a region feature recognition model corresponding to the segment enclosed by the positioning region.

25. A non-volatile computer storage medium, storing one or more modules, wherein when the one or more modules are performed by a device for executing a method for labelling a picture, the device is caused to:
acquire a target object picture; acquire information of a region of the target object in the target object picture based on a pre-established target object classification model; and
label a positioning key point for the target object picture based on a pre-established target object key point positioning model, wherein the pre-established target object key point positioning model defines a positioning region enclosing a segment of the target object, the positioning region having a predetermined shape and a predetermined size, and defines a point located in the positioning region as the positioning key point corresponding to the positioning region, the positioning key point and the positioning region having a predefined position relationship.

26. The method according to claim 10, wherein the clothes wearing region divided by the clothes classification model comprises tops, bottoms, split clothing and jumpsuits.

27. The method according to claim 10, wherein the clothes classification model is a clothes classification model established based on a convolutional neural network.

28. The apparatus according to claim 22, wherein the clothes wearing region divided by the clothes classification model comprises tops, bottoms, split clothing and jumpsuits.

* * * * *